Figure 1:
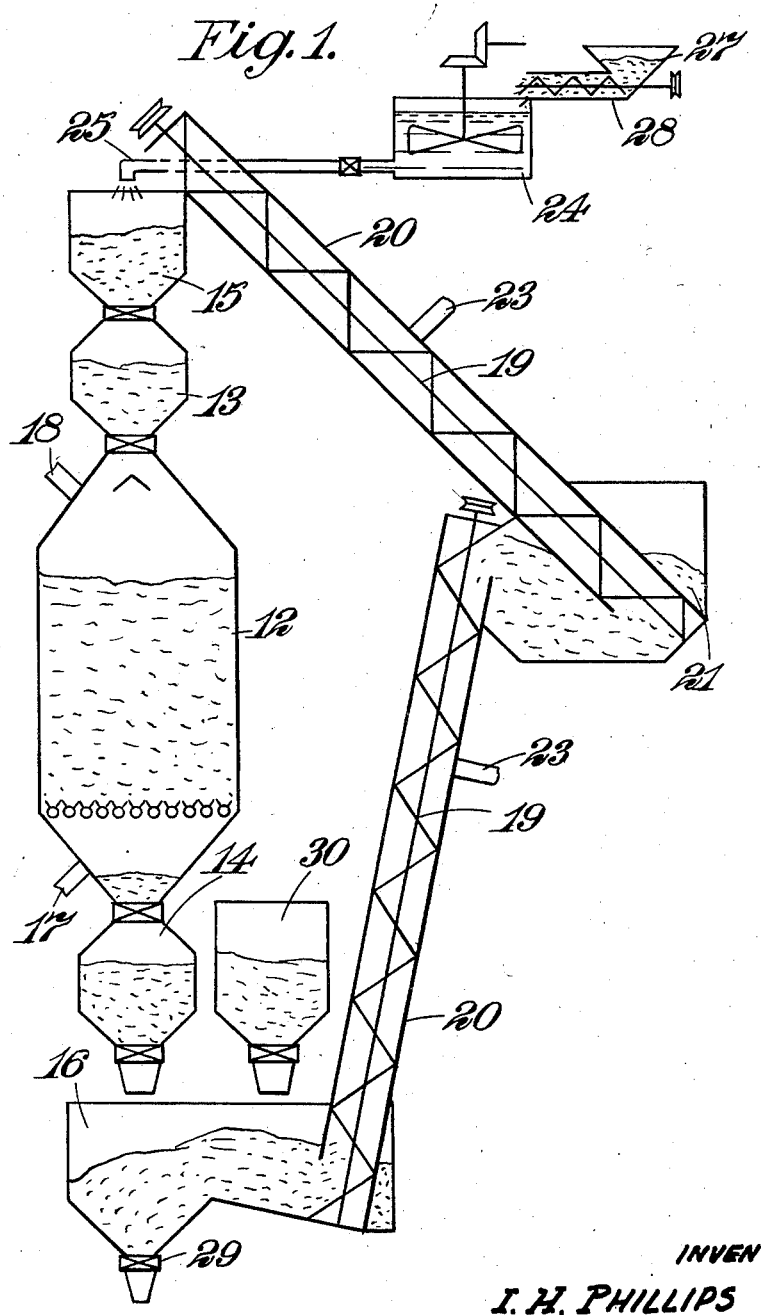

June 29, 1954     I. H. PHILLIPPS     2,682,444
CONTINUOUS PROCESS FOR THE REMOVAL OF HYDROGEN SULFIDE FROM GAS
Filed July 17, 1950     3 Sheets-Sheet 1

INVENTOR
I. H. PHILLIPS

June 29, 1954  I. H. PHILLIPPS  2,682,444
CONTINUOUS PROCESS FOR THE REMOVAL OF HYDROGEN SULFIDE FROM GAS
Filed July 17, 1950  3 Sheets-Sheet 2
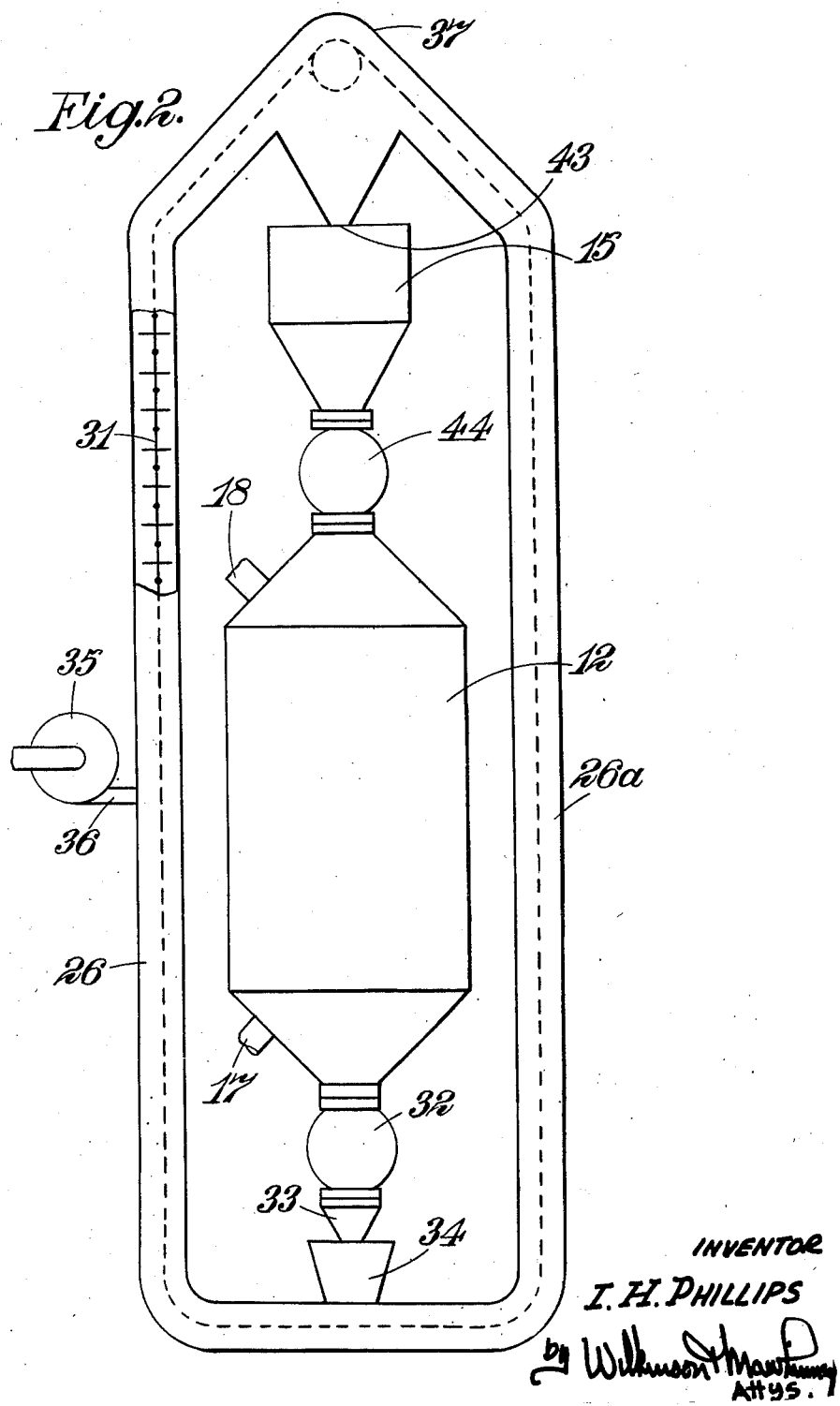

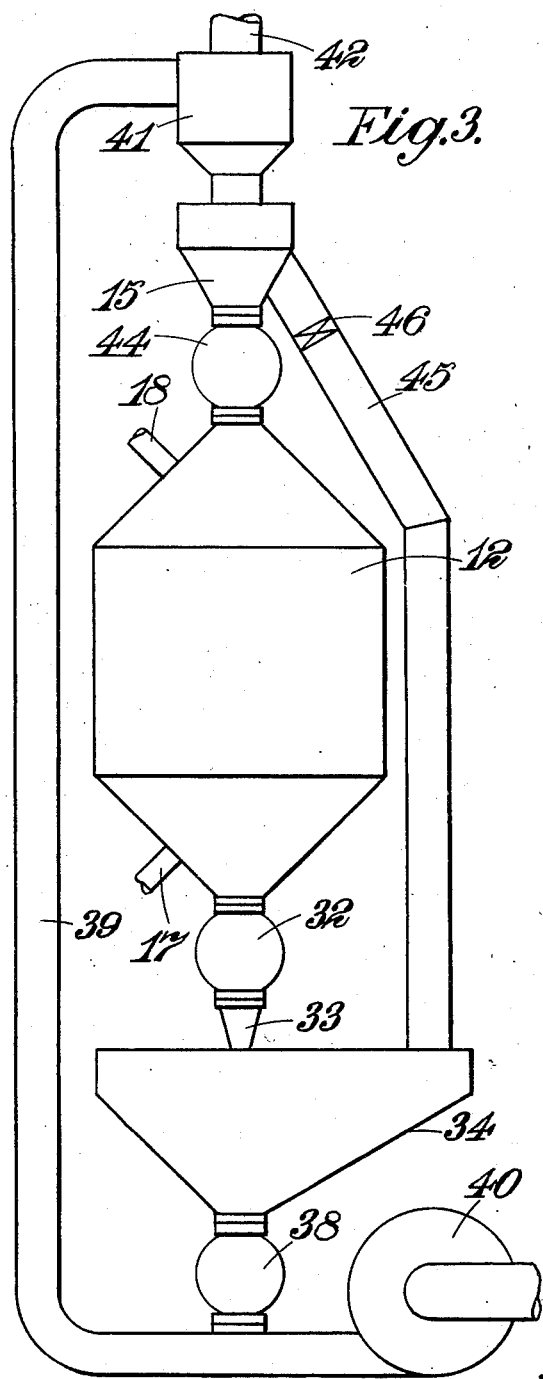

Patented June 29, 1954

2,682,444

UNITED STATES PATENT OFFICE 2,682,444

CONTINUOUS PROCESS FOR THE REMOVAL OF HYDROGEN SULFIDE FROM GAS

Ian Hugh Phillipps, London, England, assignor to Humphreys & Glasgow Limited, London, England, a British company Application July 17, 1950, Serial No. 174,207

Claims priority, application Great Britain July 26, 1949

2 Claims. (Cl. 23—2)

This invention relates to removal of hydrogen sulphide from gases by passing the gas through a packed bed of hydrated iron oxide-containing material which moves progressively downwards through a chamber, the horizontal cross-section of which bed is coincident with the cross-section of the gas path through it at any level, the purification material being progressively withdrawn from the bottom of the body or mass and being progressively added to the top and purification material which has become sulphidized or partly sulphidized being revivified for re-use by passage therethrough of air or of other oxygen-containing gas.

Such a process is described in British patent applications Nos. 559/48 and 11367/49, in both of which cases revivification of fouled or sulphidized purification material may be effected not only in situ during passage of the purification material through a purification chamber and while it is in contact with gas therein, but also externally, that is after removal of the purification material from such a chamber but before it is re-used in that chamber or in another purification chamber.

The present invention is concerned with means for revivification of fouled purification material after it has been removed from a gas purification chamber, and has for its object the performance of such "external" revivification without the necessity for a separate vessel or vessels for that purpose.

By the use of the invention a considerable saving is achieved in ground space required for the process and in the cost of plant for the purpose.

According to the invention, in a continuous process for the removal of hydrogen sulphide from gas in which the gas passes substantially vertically through a downwardly-moving packed bed of hydrated iron-oxide-containing material, the horizontal cross-section of which bed is coincident with the cross-section of the gas path through it at any level, and in which sulphidized or partly-sulphidized purification material is revivified for re-use by passage therethrough of air or other oxygen-containing gas, characterised in that some or all of the revivification of fouled or sulphidized material is effected after removal of the material from the base of the packed bed but during its transport to re-use or to other reconditioning for re-use, through a conduit or pipe through which the purification material being revivified is constrained to pass in contact with said stream of oxygen-containing gas.

The invention is not restricted to use with any particular type of conveyor or elevator, nor need it be effected in one stage, and revivification according to the invention may, if desired, be applied to fouled material during its transport to a gas-purification chamber other than the one from which it has just been withdrawn.

This invention includes in particular the case where the conduit forming the conveyor or elevator for fouled material acts also as the revivifying device for such fouled material.

It is preferred to carry out revivification according to this invention in the elevator serving to raise the material for re-use and comprising a casing or conduit substantially air-tight throughout its height wherein there is an elevating means of the drag-link, scraper, or chain type which, while raising the material, either as a column or in quanta, itself occupies only a minor part of the cross-section of the conduit and does not substantially obstruct the access of air to the particles of solid or the passage of air through the body of the solid.

It is also preferred that some agitation or disturbance of the material should occur during its passage through the conduit or conduits.

Alternatively a worm conveyor within a substantially air-tight casing or conduit is used or a pneumatic conveyor may be used, and in the latter case provision may be made for recycling some of the material through the elevating and aerating system if that be necessary to effect the desired degree of revivification.

It is to be understood that the invention is not limited to use where no revivification of fouled purification material is effected in situ within a gas purification chamber, and that it may be employed in conjunction with such revivification.

Further, it is also to be understood that revivification of spent or fouled purification material according to this invention may be followed by other reconditioning of the said material, such as adjustment of its moisture content and of its pH before it is re-used for gas purification.

The nature of this invention and the manner in which it is to be performed will be appreciated from the following description of three examples, reference being made to the accompanying drawings, in which:

Figure 1 is a diagram in elevation of one form of apparatus suitable for use in this invention, Figure 2 is a diagrammatic elevation (partly broken away) showing the application of an endless conveyor of the drag-link, scraper or chain type for the purpose of this invention, and Figure 3 is a diagram of an apparatus in which an air stream is used both for elevation and for revivification of fouled purification material.

Referring to Figure 1, 12 represents a gas purification chamber, 13 and 14 are chambers with the necessary gas-tight valves for introducing purification material into the chamber 12 and for removing it therefrom respectively, 15 and 16 being hoppers used in conjunction with the chambers 13 and 14. Gas to be purified is introduced at 17 and purified gas leaves the apparatus by a conduit 18, or when purification is to be effected with co-current flow of gas and purification material, the gas enters through the conduit 18 and leaves via conduit 17.

Fouled purification material discharged into the hopper 16 is raised in two stages by the worm conveyors 19 in the conduits 20, first to hopper 21 and thence to hopper 15. Air, for instance from a blower, is introduced into conduits 20 at inlets 23 and after passing upwardly or downwardly or both through the purification material in the conduits thereby effecting the revivification, leaves the conduits only at their ends.

The moisture content of the revivified material in hopper 15 is adjusted if required by addition of water from tank 24 by means of the valve-controlled distribution means 25, and if desired its pH may also be adjusted by means of alkali supplied to the water in tank 24 from the container 27 via the conveyor 28. The revivified and reconditioned material in hoper 15 is re-used in purifier 12 into which it is introduced through the valved chamber 13.

Replacement of expended purification material may be accomplished by withdrawal from the hopper 16 at 29, the withdrawn material being replaced for instance by addition from the container 30.

Referring to Figure 2, the elevating and aerating of the fouled purification material takes place in the substantially air-tight conduit 26 which encloses an endless conveyor 31 of the drag-link, scraper or chain type. The fouled purification material passes from the purifier 12 through a rotary valve 32 and through discharge nozzle 33 into the receiver 34 whence it passes directly to the conveyor 31 which raises it in the form of a column and delivers it first through discharge chute 43 into hopper 15 and thence through a rotary valve 44 into the chamber 12, the conveyor chain returning empty down the other limb 26a of the endless conduit.

Air from the blower 35 is introduced at 36 into the conduit 26 and is forced upwardly and downwardly through the rising column of purification material, thereby effecting its revivification, leaving the conduit 26 via the outlets 43 and 34.

By means of apparatus as shown at 24, 25, 27 and 28 in Figure 1, the moisture content and pH of the material delivered to the hopper 15 may be adjusted before it is returned to the gas purification chamber 12.

Again, as in the case of the apparatus of Figure 1, the gas for purification may be passed through chamber 12 either in counter-current to the downwardly-moving mass of purification material or in co-current flow with it, the pipes 17 and 18 serving either for exit or for entry of the gas. Again spent purification material may be withdrawn from the system and replaced by fresh material as in Figure 1.

Referring to Figure 3, fouled material from chamber 12 is discharged through a rotary valve 32 and discharge nozzle 33 into a receiver 34 from which it is fed through rotary valve 38 into the pneumatic conveyor 39 supplied with air from the blower 40. The pneumatic conveyor 39 discharges at its top end into a cyclone separator 41. The clean air passes out at 42 and the purification material is discharged from the lower end of the cyclone separator 41 into hopper 15 from which the revivified purification material passes through rotary valve 44 into chamber 12. Where it is desired to circulate part of the revivification material a branch pipe 45 with valve 46 may lead from the hopper 15 down to the receiver 34.

I claim:

1. A continuous process for the removal of hydrogen sulphide from gas, which process comprises passing the gas substantially vertically through a downwardly-moving packed bed of hydrated-iron-oxide-containing purification material, the horizontal cross-section of which bed is coincident with the cross-section of the gas path through it at any level, supplying purification material to the bed from a supply location above the bed, discharging sulfurized purification material at a discharge location beneath the bed, traversing discharged purification material from the discharge location to the supply location in a conduit by mechanical elevating means forming a rising column of purification material at least in an upright portion of said conduit, and constraining oxygen containing gas to pass downwardly through at least part of said rising column of purification material, said upright portion of the conduit being sufficiently obstructed by said column as to constrain the oxygen-containing gas to penetrate and pass through the column and the flow of oxygen-containing gas through the conduit not being substantially obstructed by said mechanically-traversing means.

2. A continuous process as claimed in claim 1 in which some agitation of the purification material occurs during its passage through the conduit.

References Cited in the file of this patent

UNITED STATES PATENTS

| Number | Name | Date |
|---|---|---|
| 1,304,697 | Mount | May 27, 1919 |
| 1,626,664 | Brady | May 3, 1927 |
| 1,731,223 | Brady | Oct. 8, 1929 |
| 1,825,707 | Wagner, Jr. | Oct. 6, 1931 |
| 1,895,601 | Beuthner | Jan. 31, 1933 |
| 2,491,500 | Longwell | Dec. 20, 1949 |